(12) United States Patent
Thalappil et al.

(10) Patent No.: US 11,242,468 B2
(45) Date of Patent: Feb. 8, 2022

(54) AQUEOUS COMPOSITION AND A METHOD OF PRODUCING DURABLE AND EXTREMELY EFFICIENT WATER REPELLING SUPERHYDROPHOBIC MATERIALS AT AMBIENT CONDITION THEREOF

(71) Applicant: INDIAN INSTITUTE OF TECHNOLOGY MADRAS, Chennai (IN)

(72) Inventors: Pradeep Thalappil, Chennai (IN); Avijit Baidya, Chennai (IN); Mohd. Azhardin Ganayee, Chennai (IN); Swathy Jakka Ravindran, Chennai (IN)

(73) Assignee: INDIAN INSTITUTE OF TECHNOLOGY MADRAS (ITT MADRAS), Tamil Nadu (IN)

(*) Notice: Subject to any disclaimer, the term of this patent is extended or adjusted under 35 U.S.C. 154(b) by 387 days.

(21) Appl. No.: 16/163,325

(22) Filed: Oct. 17, 2018

(65) Prior Publication Data
US 2019/0112494 A1    Apr. 18, 2019

(30) Foreign Application Priority Data
Oct. 17, 2017   (IN) .............................. 201741036772

(51) Int. Cl.
*C09D 101/00* (2006.01)
*C09D 101/02* (2006.01)
(Continued)

(52) U.S. Cl.
CPC ............ *C09D 101/02* (2013.01); *C08B 15/05* (2013.01); *C08B 15/06* (2013.01); *C09D 5/1681* (2013.01);
(Continued)

(58) Field of Classification Search
None
See application file for complete search history.

(56) References Cited

U.S. PATENT DOCUMENTS

| 2008/0004691 | A1* | 1/2008 | Weber | ................... | A61L 31/088 |
| | | | | | 623/1.16 |
| 2013/0061774 | A1* | 3/2013 | Landry | ................ | C08F 251/02 |
| | | | | | 106/204.2 |
| 2017/0190961 | A1* | 7/2017 | Nguyen | ................. | E21B 43/26 |

FOREIGN PATENT DOCUMENTS

| CN | 104987520 A | * | 10/2015 | |
| WO | WO-2010066905 A1 | * | 6/2010 | ............. C08B 15/05 |

OTHER PUBLICATIONS

CN-104987520-A, English translation (Year: 2015).*

(Continued)

*Primary Examiner* — Stefanie J Cohen (57) ABSTRACT

The present invention relates to adurable and multifunctional superhydrophobic coating composition and water based fabrication method of producing the durable and multifunctional superhydrophobic coating composition via chemical modification and functionalization of hydrophilic material by silanes under room temperature without any organic solvents. Synthesis of chemically modified cellulose nanofibers or clay in water forms excellent water repelling thin films upon coating over various substrates. The super hydrophobic materials are used as additive for paints, pigments, paper, varnish and, textile and used for various industrial applications such as construction of buildings and other super structures.

11 Claims, 7 Drawing Sheets

(51) Int. Cl.

| | |
|---|---|
| *C09D 7/63* | (2018.01) |
| *C09D 7/61* | (2018.01) |
| *C08B 15/05* | (2006.01) |
| *C08B 15/06* | (2006.01) |
| *C09D 101/08* | (2006.01) |
| *C09D 5/16* | (2006.01) |
| *C08K 3/34* | (2006.01) |
| *C08K 9/06* | (2006.01) |

(52) U.S. Cl.
CPC .......... *C09D 7/61* (2018.01); *C09D 7/63* (2018.01); *C09D 101/08* (2013.01); *C08K 3/346* (2013.01); *C08K 9/06* (2013.01)

(56) References Cited

OTHER PUBLICATIONS

Yunfeng Lu et al, Continuous formation of supported cubic and hexagonal mesoporous films by sol-gel dip-coating, Sep. 25, 1997, Nature Macmillan Publishers Ltd 1997, Nature/vol. 389, pp. 364-369.
N.P. Rao et al, Hypersonic Plasma Particle Deposition of Nanostructured Silicon and Silicon Carbide, J. Aerosol Sci. vol. 29, No. 5/6, 1998 Elsevier Science Ltd., pp. 707-720.
Akira Nakajima et al, Recent Studies on Super-Hydrophobic Films, Research Center for Advanced Science and Technology, The University of Tokyo, Tokyo 153-8904, Japan, Monatshefte für Chemie Chemical Monthly, Springer-Verlag 2001, Austria, pp. 31-41.
Andrew R. Parker et al, Water capture by a desert beetle, Department of Zoology, University of Oxford, Macmillan Magazines Ltd, Nature Magazine, vol. 414, Nov. 2001, pp. 33-34.
K.L. Choy, Chemical vapour deposition of coatings, Department of Materials, Imperial College of Science, Technology and Medicine, Progress in Materials Science 48, 2003, pp. 57-170.
Taolei Sun et al., Bioinspired Surfaces with Special Wettability, National Center for NanoScience and Technology, Accounts of Chemical Research, vol. 38, No. 8, May 19, 2005, pp. 644-652.
Marianna Kemell, et al, Atomic Layer Deposition in Nanometer-Level Replication of Cellulosic Substances and Preparation of Photocatalytic TiO2/Cellulose Composites, Laboratory of Inorganic Chemistry, Department of Chemistry, University of Helsinki, Finland and Department of Physical Chemistry, Abo Akademi University, JACS Communications, 127, Pages Sep. 24, 2005, pp. 14178-14179.
Kesong Liu et al, Bioinspired construction of Mg—Li alloys surfaces with stable superhydrophobicity and improved corrosion resistance, Applied Physics Letters, 2008 American Institute of Physics, 92, 183103 doi: 10.1063/1,2917463, AIP Publishing.
Yong Chae Jung et al, Mechanically Durable Carbon Nanotube—Composite Hierarchical Structures with Superhydrophobocity, Self-Cleaning, and Low-Drag, Nanoprobe Laboratory for Bio-& Nano-technology and Biomimetics (NLB), The Ohio State University, ACS NANO, vol. 3, No. 12, 2009, pp. 4155-4163.
Yongmei Zheng et al., Directional water collection on wetted spider silk, School of Chemistry and Environment, Beijing University of Aeronautics and Astronautics, National Center for Nanoscience and Technology, Beijing National Laboratory for Molecular Sciences, Institute of Chemistry, and Chinese Academy of Sciences, vol. 463 Feb. 4, 2010, doi:10.1038, 2010, Macmillan Publishers Limited, Nature Magazine, 08729, pp. 640-643.
Seung Goo Lee et al, Switchable Transparency and Wetting of Elastomeric Smart Windows, Department of Chemical Engineering, Polymer Research Institute, and Pohang University of Science and Technology, Materials Views, Adv. Mater. 2010, 22, pp. 5013-5017.
Manish K. Tiwari et al, Highly Liquid-Repellent, Large-Area, Nanostructured Poly(vinylidenefluoride)/Poly(ethyl 2-cyanoacrylate) Composite Coatings: Particle Filler Effects, Department of Mechanical and Industrial Engineering, University of Illinois at Chicago, and Department of Aerospace Engineering, University of Illinois, ACS Applied Materials & Interfaces, vol. 2, No. 4, 2010, pp. 1114-1119.
Lidiya Mishchenko et al, Design of Ice-Free Nanostructured Surfaces Based on Repulsion of Impacting Water Droplets, School of Engineering and Applied Sciences, Wyss Institute for Biologically Inspired Engineering, Harvard University, and Department of Mechanical Engineering, University of Wisconsin-Madison, ACS Nano, vol. 4, No. 12, 2010, pp. 7699-7707.
Kyoo-Chul Park et al, Nanotextured Silica Surfaces with Robust Superhydrophobocity and Omnidirectional Broadband Supertransmissivity, Department of Mechanical Engineering, Massachusetts Institute of Technology, Department of Mechanical & Aerospace Engineering, North Carolina State University, Department of Chemical Engineering, and Singapore-MIT Alliance for Research and Technology, ACS Nano, vol. 6, No. 5, 2012, pp. 3789-3799.
Peng Guo et al, Icephobic/Anti-Icing Properties of Micro/Nanostructured Surfaces, Key Laboratory of Bio-Inspired Smart Interfacial Science and Technology of Ministry of Education School of Chemistry and Environment, Materials Views, Adv. Mater. 2012, doi: 10.1002/adma.201104412, pp. 1-7.
Chih-Feng Wang et al, Robust Superhydrophobic/Superoleophilic Sponge for Effective Continuous Absorption and Expulsion of Oil Pollutants from Water, Department of Materials Science and Engineering, I-Shou University, ACS Publications, dx.doi.org/10.1021/am-403266v/ACS Appl. Mater. Interfaces, Sep. 12, 2013, pp. A-D.
Seung Goo Lee et al,Transparent Superhydrophobic/Translucent Superamphiphobic Coatings Based on Silica-Fluoropolymer Hybrid Nanoparticles, Department of Chemical Engineering, Pohang University of Science and Technology, ACS Publications, dx.dol.org/10.1021/la404005b, Langmuir 29, 2013, pp. 15051-15067.
Joseph E. Mates et al, Water-Based Superhydrophobic Coatings for Nonwoven and Cellulosic Substrates, Department of Mechanical and Industrial Engineering, University of Illinois at Chicago, Nanophysics, Instituto Italian di Tecnologia, Corporate Research and Engineering, Kimberly-Clark Corporation, ACS Publications, dx.dol.org/10.1021/le402836x, Ind. Eng Chem. Res, 53, 2013, pp. 222-227.
Thomas M. Schutzius et al, Water-Based, Nonfluorinated Dispersions for Environmentally Benign, Large-Area, Superhydrophobic Coatings, Department of Mechanical and Industrial Engineering, University of Illinois at Chicago, Department of Mechanical and Process Engineering, Swiss Federal Institute of Technology, Nanophysics, Instituto Italiano di Tecnologia, Corporate Research and Engineering, Kimberly-Clark Corporation, ACS Publications, dx.doi.org/10.1021/am4043307, ACS Appl. Mater. Interfaces, 5, 2013, pp. 13419-13425.
Xiyao Zhang et al, Bioinspired Multifunctional Foam with Self-Cleaning and Oil/Water Separation, Key Laboratory of Bio-Inspired Smart Interfacial Science and Technology of Ministry of Education, School of Chemistry and Environment, Beihang University, Beijing National Laboratory for Molecular Sciences (BNLMS), Key Laboratory of Organic Solids, Institute of Chemistry, and Chinese Academy of Sciences, Materials Views-Adv. Funct. Mater, DOI: 10.1022/adfm.201202662, 2013, pp. 1-6.
Qing Zhu et al, Mussel-Inspired Direct Immobilization of Nanoparticles and Application for Oil-Water Separation, School of Chemical Engineering and Technology, Harbin Institute of Technology, ACS Nano, vol. 8, No. 2, 2014, pp. 1402-1409.
Sanjay S. Latthe et al, Development of sol-gel processed semi-transparent and self-cleaning superhydrophobic coatings, Journal of Materials Chemistry A, Royal Society of Chemistry, J. Mater. Chem. A, 2, Mar. 10, 2014, pp. 5548-5553.
Amir Pakdel et al, Plasma-Assisted Interface Engineering of Boron Nitride Nanostructure Films, World Premier International Center for Materials Nanoarchitectonics (WPI-MANA), National Institute for Materials Science (NIMS), ACS Nano, 10.1021/nn5041729, 2014, pp. A-J.
Daniel C. Leslie et al, A bioinspired omniphobic surface coating on medical devices prevents thrombosis and biofouling, Wyss Institute for Biologically Inspired Engineering, School of Engineering and Applied Sciences, Harvard Medical School, Harvard University, Vascular Biology Program, Division of Newborn Medicine, Animal (56) References Cited

OTHER PUBLICATIONS

Research, Boston University, Department of Chemistry and Chemical Biology, Harvard University, Nature Biotechnology, doi 10.1038/nbt.3020, Oct. 12, 2014, pp. 1-10.
Kunlin Chen et al, Fabrication of All-Water-Based Self-Repairing Superhydrophobic Coatings Based on UV-Responsive Microcapsules, Materials Views, Adv. Funct. Mater., DOI:10/1002/adfm. 201403496, 2014, pp. 1-7.
Hannu Teisala et al, Superhydrophobic Coatings on Cellulose-Based Materials: Fabrication, Properties, and Applications, Tampere University of Technology, Department of Materials Science, and Paper Converting and Packaging Technology, Adv. Mater. Interfaces 2014, 1, 1300026, 2013, pp. 1-20.
Shanshan Chen et al, Intumescent Flame-Retardant and Self-Healing Superhydrophobic Coatings on Cotton Fabric, State Key Laboratory of Supramolecular Structure and Materials, International Joint Research Laboratory of Nano-Micro Architecture Chemistry, College of Chemistry and Jilin University, ACS Nano, 10.1021/acsnano.5b00121, 2015, pp. A-G.
Yao Lu et al, Robust self-cleaning surfaces that function when exposed to either air or oil, Department of Chemistry, University College London, Key Laboratory for Precision and Non-traditional Machining Technology of Ministry of Education, Dalian University of Technology, and Department of Chemistry, Science Magazine, vol. 347, Issue 6226, Mar. 6, 2015, pp. 1132-1135.
Gibum Kwon et al, Membranes with selective wettability for the separation of oil-water mixtures, Department of Materials Science and Engineering, University of Michigan, Biointerfaces Institute, Macromolecular Science and Engineering, MRS Communications, 5, Materials Research Society, doi: 10.1557/mrc.2015.61, 2015, pp. 475-494.
Alexander B. Tesler et al, Extremely durable biofouling-resistant metallic surfaces based on electrodeposited, nanoporous tungstite films on steel, Nature Communications, 6:8649, doi: 10.1038/ncomms9649, Oct. 20, 2015, pp. 1-10.
Li-Ping Xu et al, Ultratrace DNA Detection Based on the Condensing-Enrichment Effect of Superwettable Microchips, Research Center for Bioengineering and Sensing Technology, University of Science & Technology Beijing, and Laboratory of Bioinspired Smart Interface Science, Technical Institute of Physics and Chemistry, and Chinese Academy of Sciences, Materials Views, Adv. Mater. 2015, 27, 2015, pp. 6878-6884.
Xiao-Qui Dou et al, Bioinspired Hierarchical Surface Structurs with Tunable Wettability for Regulating Bacteria Adhesion, ACS Nano, 10.1021/acsnano.5b04231, 2015, pp. A-I.
Kevin Golovin et al, Designing durable icephobic surfaces, Department of Materials Science and Engineering, Biointerfaces Institute, Department of Macromolecular Science and Engineering, Rocket Propulsion Division, Air Force Research Laboratory, Edwards Air Force Base, and Department of Chemical Engineering, University of Michigan, Sci. Adv. 2:e1501496, Mar. 11, 2016, pp. 1-12.
Kevin B. Golovin et al, Bioinspired surfaces for turbulent drag reduction, Department of Materials Science and Enginering, Department of Naval Architecture and Marine Engineering, Department of Chemical Engineering and Department of Macromolecular Science and Engineering, University of Michigan, The Royal Society Publishing, Phil. Trans. R.Soc. A374: 20160189, 2016, pp. 1-20.
Yue Zhang et al, Paper-Based Hydrophobic/Lipophobic Surface for Sensing Applications Involving Aggressive Liquids, Functional Nanomaterials Laboratory Center for Micro/Nanomaterials and Technology and Key Laboratory of Photochemical Conversion and Optoelectronic Materials, Technical Institute of Physics and Chemistry, and Chemistry Chinese Academy of Sciences, University of Chinese Academy of Sciences, Key Laboratory of Photochemical Conversion and Optoelectronic Materials, Technical Institute of Physics and Chemistry, and Chinese Academy of 2016.
Jian Li et al, Robust Superhydrophobic Fabric Bag Filled with Polyurethane Sponges Used for Vacuum-Assisted Continuous and Ultrafast Absorption and Collection of Oils from Water, Key Laboratory of Eco-Environment-Related Polymer Materials, Ministry of Education of China, Key Laboratory of Gansu Polymer Materials, College of Chemistry and Chemical Engineering, and Northwest Normal University, Materials Views, Adv. Mater. Interfaces 3, 1500770, 2016, pp. 1-8.
L. Li et al, Roles of silanes and silicones in forming superhydrophobic and superoleophobic materials, Center of Eco-Material and Green Chemistry, and State Key Laboratory for Oxo Synthesis & Selective Oxidation, Lanzhou Institute of Chemical Physics, Chinese Academy of Sciences and Graduate University of the Chinese Academy of Sciences, The Royal Society of Chemistry, J. Mater. Chem. A, DOI: 10.1039/C6TA05441B, 2016, pp. 1-47.
Chao Li et al, Paper-Based Surfaces with Extreme Wettabilities for Novel, Open-Channel Microfluidic Devices, Department of Materials Science and Engineering, Department of Macromolecular Science and Engineering, Department of Macromolecular Science and Engineering, Department of Biomedical Engineering, and Department of Chemical Engineering University of Michigan, Adv. Funct. Mater. DOI: 10.1002/adfm.201601821, 2016, pp. 1-11.
H. Husni et al, Superhydrophobic rice hush ash coating on concrete, Faculty of Civil Engineering, and Faculty of Chemical Engineering, Universiti Teknoloigi MARA, School of Chemical Engineering, Universiti Sains Malaysia, and Department of Chemical Engineering, University of Malaya, Construction and Building Materials, 144, 2017, pp. 385-391.
Ferdi Hizal et al, Nanoengineered Superhydrophobic Surfaces of Aluminum with Extremely Low Bacterial Adhesivity, Department of Mechanical Engineering, Stevens Institute of Technology, University of Groningen and University Medical Center Groningen, Department of Biomedical Engineering, Food Technology Program, School of Argo-Industry, Department of Human Nutrition, Ford and Animal Sciences, and University of Hawaii, ACS Appl. Materials & Interfaces, 9, 2017, pp. 12118-12129.
Xu Hou et al, Interplay between materials and microfluidics, Nature Reviews/Materials, vol. 2, Article No. 17016/1, Macmillan Publishes Limited, 2017, pp. 1-15.
H. Ye et al, Simple Spray Deposition of the Water-based Superhydrophobic Coatings with High Stability for Flexible Applications, Key Laboratory of Aerospace Materials and Performance (Ministry of Education), School of Materials Science and Engineering, Beihang University, Beijing, Journal of Materials Chemistry, 2013, pp. 1-9.

* cited by examiner

AQUEOUS COMPOSITION AND A METHOD OF PRODUCING DURABLE AND EXTREMELY EFFICIENT WATER REPELLING SUPERHYDROPHOBIC MATERIALS AT AMBIENT CONDITION THEREOF

FIELD OF THE INVENTION

The present invention relates to an eco-friendly, durable and multifunctional superhydrophobic coating composition and water based fabrication method of producing the durable and multifunctional superhydrophobic coating composition via chemical modification and functionalization of hydrophilic material by silanes under room temperature without any organic solvents. Synthesis of chemically modified cellulose nanofibers or clay in water forms excellent water repelling thin films upon coating over various substrates. The super hydrophobic materials are used as additive for paints, pigments, paper, varnish and, textile and used for various industrial applications such as construction of buildings and other super structures.

The present invention also relates to an eco-friendly and facile methodology to develop a multifunctional superhydrophobic composition. More precisely, the present invention relates to a water based method for developing efficient water repelling superhydrophobic composition by chemical modification and functionalization of hydrophilic materials under room temperature and ambient condition.

BACKGROUND OF THE INVENTION

Designing materials for the preparation of water repellent thin films with robust and durable characteristics has attracted considerable attention over the years because of their wide possible applications in different fields of science and engineering. Surface engineering being a convenient way to tune the characteristic properties of various materials, has become one of the most important research areas of recent decades. Various techniques such as plasma deposition [Pakdel A et al., ACS Nano 2014, 8, 10631-10639], chemical vapor deposition (CVD) [Choy, K. L et al., Prog. Mater Sci. 2003, 48, 57-170], atomic layer deposition (ALD) [Kemmell, M et al., J. Am. Chem. Soc. 2005, 127, 14178-14179], nanoparticle deposition[Rao, N. P et al., J. Aerosol Sci. 1998, 29, 707-720], and sol-gel methods[Lu, Y et al., Nature, 1997, 389, 364-368] have been developed to create micro/nanoscale coatings that essentially control the properties of materials by introducing functionalities on the surface. Among these, developing materials with tunable surface wettability is one such interesting research direction that expanded to several potential applications such as self-cleaning [Sun T et al., Acc. Chem. Res. 2005, 38, 644-652; Zhang X et al., Adv. Funct. Mater. 2013, 23, 2881-2886; Park, K. C et al., ACS Nano 2012, 6, 3789-3799], anti-corrosion [Liu K et al., Appl. Phys. Lett. 2008, 92, 183103], water-oil separation[Kwon G et al., MRS Commun, 2015, 5, 475-494; Li J et al., Adv. Mater. Interfaces, 2016, 3, 1500770; Zhu Q et al., ACS Nano, 2014, 8, 1402-1409], anti-icing[Mishchenko L et al., ACS Nano, 2010, 4, 7699-7707; Guo P, et al., Adv. Mater., 2012, 24, 2642-2648; Golovin K et al., Sci. Adv., 2016, 2, e1501496], drag reduction [Golovin K. B et al., Philos. Trans. R. Soc. London, Ser. A, 2016, 374, 2073; Jung Y. C et al., ACS Nano, 2009, 3, 4155-4163], sensing [Zhang, Y et al., Adv. Mater. Interfaces, 2016, 3, 1600672; Xu L. P et al., Adv. Mater., 2015, 27, 6878-6884], atmospheric water capture [Zheng Y et al., Nature, 2010, 463, 640-643; Parker A. R et al., Nature, 2001, 414, 33-34], construction materials [Husni H, et al., Constr. Build. Mater., 2017, 144, 385-391], microfluidic devices [Li C et al., Adv. Funct. Mater. 2016, 26, 6121-6131], smart windows [Lee S. G et al., Adv. Mater., 2010, 22, 5013-5017], etc. Surfaces with low surface energy also minimize bacterial adhesion which essentially prevents the growth of biofilms, known as biofouling [Hizal F et al., ACS Appl. Mater. Interfaces, 2017, 9, 12118-12129; Leslie D. C et al., Nat. Biotechnol., 2014, 32, 1134-1140; Tesler A. B et al., Nat. Commun., 2015, 6, 8649; Hou X et al., Nat. Rev. Mater., 2017, 2, 17016; Dou X.-Q et al., ACS Nano, 2015, 9, 10664-10672]. However, designing surfaces of such kind needs both artificial micro/nano-scale structuring and chemical modifications with low surface energy molecules [A. Nakajima et al., Monatshefte fur Chemie/Chemical Monthly, 2001, 132, 31; S. G. Lee et al., Langmuir, 2013, 29, 15051].

Meanwhile, availability of different chemically functionalizable materials has enhanced the interest to design such materials by wet-chemical techniques [Chen K et al., Adv. Funct. Mater. 2015, 25, 1035-1041; Lu Y et al., Science 2015, 347, 1132-1135] that can be coated on various substrates of non-identical surface morphology through easily accessible coating processes. Clays [Mates, J. E et al., Ind. Eng. Chem. Res. 2014, 53, 222-227], polymers[Tiwari, M. K et al., ACS Appl. Mater. Interfaces, 2010, 2, 1114-1119], oxide nanoparticles [Li L et al., J. Mater. Chem. A 2016, 4, 13677-13725], cellulosic materials [Teisala H, et al., Adv. Mater. Interfaces 2014, 1, 1300026; Chen, S et al., ACS Nano 2015, 9, 4070-4076], etc., are often used as templates for the same.

There are few reports on waterborne superhydrophobic materials [Chen K et al., Adv. Funct. Mater. 2015, 25, 1035-1041; Mates, J. E et al., Ind. Eng. Chem. Res. 2014, 53, 222-227; Ye, H et al., J. Mater. Chem. A 2017, 5, 9882-9890; Schutzius, T. M et al., ACS Appl. Mater. Interfaces, 2013, 5, 13419-13425], in most of the cases organic solvents are used extensively as the primary solvent medium [Li L et al., J. Mater. Chem. A 2016, 4, 13677-13725; Latthe, S. S et al., J. Mater. Chem. A 2014, 2, 5548-5553; Wang, C.-F et al., ACS Appl. Mater. Interfaces, 2013, 5, 8861-8864] which limit the dispersibility of hydrophilic materials. In addition, use of organic solvents also raises a concern regarding the safety, environmental pollution and cost of production. Therefore, fabrication of waterborne superhydrophobic materials from CNFs or clay is desirable.

Thus the present invention relates to the development of a super hydrophobic material at ambient conditions through the chemical modification of hydrophilic materials including cellulose nanofibers (CNFs) and clay, in water. Synthesized materials can be coated over a range of substrates (such as glass, wood, metal, paper, etc) and provides excellent water repelling property upon drying in room temperature. The water-based coating materials (both CNF and clay) do not change the flexibility of the soft substrates.

SUMMARY OF THE INVENTION

The present invention relates to a fabrication of superhydrophobic compositions via chemical modification and functionalization of hydrophilic material in water by slimes under room temperature without using any organic solvent.

In fact, the present invention provides an eco-friendly, durable and multifunctional superhydrophobic coating composition, the said composition comprising hydrophilic material in the range of 0.25 wt %-2.06 wt % and one or more silanes in the range of 0.24 wt %-2.05 wt %, and the remaining being water in the range of 97.7 wt %-99.51 wt %, wherein the said hydrophilic material is chemically modified and functionalized using the said silanes in aqueous medium and free of any organic solvent. The hydrophilic material includes cellulose nanofibers and clays, and the clays include kaolinite clay. The silanes include amino silane, fluorosilane and alkyl silane.

In another embodiment, the coating composition of the invention comprising amino silane which includes 3-(2-aminoethylamino) propyltrimethoxysilane, the fluorosilane includes 1H,1H,2H,2H-perfluorooctyltriethoxysilane and the alkyl silane includes n-octadecylsilane. The amino silane is used to develop transparent water repellent coating with fluorosilanes, unsaturated molecules including monomeric, polymeric, polar and nonpolar acrylates depending on their solubility and dispersibility in different solvents.

Yet another embodiment of the invention relates to a water based fabrication method of superhydrophobic coating composition wherein the said method includes chemical modification and functionalization of cellulose nanofiber by a wet chemical process in an aqueous medium free of any organic solvent, said method comprising the steps of:
 a. dispersing hydrophilic cellulose nanofiber in an aqueous medium,
 b. mixing with two different functional silanes namely 1H,1H,2H,2H-perfluorooctyltriethoxysilane and 3-(2-aminoethylamino) propyltrimethoxysilane, and
 c. Vigorous stirring for 6-7 hours under room temperature.

One more embodiment of the invention relates to a water based fabrication method of superhydrophobic coating composition wherein the said method includes chemical modification and functionalization of kaolinite clay by a wet chemical process in an aqueous medium free of any organic solvent comprising the steps of
 a. dispersing hydrophilic kaolinite clay in an aqueous medium,
 b. mixing with two different functional silanes namely n-octadecylsilane, and 3-(2-aminoethylamino) propyltrimethoxysilane or 1H,1H,2H,2H-perfluorooctyltriethoxysilane and 3-(2-aminoethyl amino) propyltrimethoxysilane, and
 c. Vigorous stirring for 6-7 hours under room temperature.

Another embodiment of the invention relates to superhydrophobic coating composition which adsorbs moisture and $CO_2$ from air at room temperature and provides excellent water repelling properties and force water to sit as a droplets having contact angle greater than 160° and roll-off angle less than 10°.

Further embodiment of the invention relates to a method wherein the superhydrophobic coating composition is coated on an article or substrate by spray coating, doctor blading, dip coating, and spin coating, and the coating can be coated over flat and different curved surfaces.

Another embodiment of the invention provides a superhydrophobic coating composition which can be coated over a range of soft (paper, cotton, etc.) and hard (metal wood, plastic, etc.) substrates, and also used as an additives for paint, pigments, paper, varnish and, textiles and used in construction industry. In addition, the superhydrophobic coating composition of the present invention does not change the flexibility of the soft substrates, like paper, cotton. Further, the superhydrophobic coating composition of the present invention is inert to organic solvents and oils.

Furthermore, the present invention provides an eco-friendly, durable and multifunctional superhydrophobic cellulose nanofiber coating material, comprising a composition including, 0.25 wt % of hydrophilic cellulose nanofiber (CNF), 0.61 wt % of 1H,1H,2H,2H-perfluorooctyltriethoxysilane, 0.92 wt % of 3-(2-aminoethylamino) propyltrimethoxysilane and the remaining 98.22 wt % being water, wherein the said cellulose nanofiber is chemically modified and functionalized using the said silanes in aqueous medium.

Additional embodiment of the invention relates to an eco-friendly, durable and multifunctional superhydrophobic kaolinite clay coating material, comprising a composition including, 1.47 wt % of hydrophilic kaolinite clay, 0.24 wt % of 1H,1H,2H,2H-perfluorooctyltriethoxysilane/0.36 wt % n-octadecylsilane, 0.49 wt % of 3-(2-aminoethylamino) propyltrimethoxysilane and the remaining 97.68 wt %-97.8 wt % being water, wherein the said kaolinite clay is chemically modified and functionalized using the said silanes in aqueous medium.

Moreover, the present invention relates to a substrate coated with the composition of the present invention wherein the said substrate exhibits robust nature against mechanical abrasions, thermal stability in the range of −50° C. to 200° C. and also exhibits antibacterial and antifungal properties.

One more embodiment the invention relates to durable and multifunctional superhydrophobic coating composition fabricated through chemical modification and functionalization of cellulose nanofiber (CNFs). The cellulose nanofiber is modified by a wet chemical process in an aqueous medium free of any organic solvent. The cellulose nanofiber is treated with silanes including amino silane, fluorosilane and alkyl silane in water under room temperature. Chemical functionalities enhanced the binding capability of the CNFs with various substrates without any adhesive, physical appearance along with the mechanical flexibility of the waterproof-paper remains unchanged, unlike the normal CNF paper. Chemical functionalization-induced enhancement of integrity (between the fibers) and excellent microbial resistance of the waterproof paper provide a basis for its applications in different paper-based technologies.

In other embodiment the invention relates to durable and multifunctional superhydrophobic coating composition fabricated through chemical modification and functionalization of kaolinite clay. The kaolinite clay is modified by a wet chemical process in an aqueous medium free of any organic solvent. The kaolinite clay is treated with silanes including amino silane, fluorosilane in water under room temperature. The kaolinite clay easily forms superhydrophobic thin films in room temperature that withstand various mechanical and chemical stresses. In particular, the surface showed excellent water repelling property even after 100 cycles of various mechanical abrasions such as sand paper abrasion, finger wiping etc. Interestingly, the coated thin film functions equally well at both air-solid and oil-solid interface which is the reason of controlled surface energy obtained during the slow evaporation of water from the coated film. Moreover, surface tension induced better binding capability of the material with soft and fibrous substrates makes the coating efficient to design a flexible waterproof paper, a promising materials platform for paper-based technologies.

In another embodiment the invention relates to a stable waterborne superhydrophobic material developed in ambient conditions that forms durable nano-structured coatings at room temperature over a range of hard and soft substrates without any adhesive. Water droplets were seen to have a contact angle >170° (±2°) for clay based material and >160° (±2° for CNF based material coated surface. In both cases, roll-off angle was observed <10° (±2°). The coating shows excellent durability against various induced damages (cyclic physical abrasion, chemical perturbations and a series of environmental stresses) and works efficiently both in air and within oils, even when the oil occupies air pockets of the surface.

In other embodiment the invention relates to a water-soluble amino silane which can be used to design a transparent or semi-transparent, robust waterproof or water repelling coating via spontaneous chemical reaction at room temperature with unsaturated molecules like acrylates (monomer/polymer, polar/nonpolar) and others (monomer/polymer, polar/nonpolar) depending on their solubility on different solvents (polar/nonpolar).

The superhydrophobic coating composition has water repellent properties which can be used in paint, pigments, paper, varnish, textile, etc. The coating showed excellent stability and unaltered water repelling property against various mechanical, chemical and environmental stresses. This superhydrophobic coating composition also exhibits antibacterial and antifungal properties. In addition the amino silane functionalized superhydrophobic coating composition is capable of adsorbing moisture and $CO_2$ from air at room temperature.

BRIEF DESCRIPTION OF THE ACCOMPANYING DRAWINGS

The invention has been described with a few embodiments of the invention, and examples of which may be illustrated in the accompanying figures. These figures are intended to be illustrative, not limiting. Although the invention is generally described in the context of these embodiments, it should be understood that it is not limit the scope of the invention to these particular embodiments.

FIG. 9 shows (A, B) Self-cleaning property of superhydrophobic material coated glass surface, iron oxide powder was used as the model dirt. (C, D) Coated surface retains its water repelling behavior even after artificially induced chemical damages with various organic solvents (ethanol treated surface is demonstrated here). (E) Durability/longevity of the coating under extreme chemically hazardous conditions. Surfaces were kept inside various organic solvents having different polarity and the static contact angle of water droplet was measured after taking the surface out from the solvent in a regular time interval for 170 h. (Inset) Photograph showing static contact angle of water on 160 h oil treated surface. (F,G) Self-cleaning property of the coated surface at the air-solid-oil interface. A portion of the surface was kept inside oil (n-octane, taken as a model long chain hydrocarbon); an inorganic salt (potassium permanganate) was placed over it as a model of dirt. Rolling water droplets removed all the dirt from both the interfaces and made the surface clean. (H) The superhydrophobic coating also remained functional inside/under oil (n-octane)

FIG. 11 shows demonstration for durability of waterproof paper. (A) Unstable water drops on coated filter paper (lotus leaf effect). The inset shows the retained mechanical flexibility of the paper after coating, (B) Induced twisting/bending on the coated paper. Colored water drop on the folded paper that changed its shape to oval due to induced strain by the folded paper. Inset, i) vertical view of the folded paper after removal of water drop (after 10 mins). Any stain of the color drop was not observed. ii-iii) Water drop on relatively relaxed folded waterproof paper. (C) Durability/longevity of waterproof paper under various mechanical and environmental stresses. Measured static CA and CAHs of water droplet after a regular time interval (details in the experimental section). (D-F) Oil washing test. (D) Paraffin oil adhering on the coated filter paper. (E) The same paper after washing thoroughly with acetone and ethanol to remove oil. (F) Washed paper shows almost similar water repelling property.

Referring to the drawings, the embodiments of the present invention are further described. The figures are not necessarily drawn to scale, and in some instances the drawings have been exaggerated or simplified for illustrative purposes only. One of ordinary skill in the art may appreciate the many possible applications and variations of the present invention based on the following examples of possible embodiments of the present invention.

DETAILED DESCRIPTION OF THE INVENTION

The present invention relates to a fabrication of superhydrophobic composition via chemical modification and functionalization of hydrophilic material in water by silanes under room temperature without using any organic solvent.

The synthesis of waterborne superhydrophobic material by an easy chemical modification of hydrophilic materials such as CNFs and kaolinite clay at room temperature with two functional silanes are described in the following sections Materials All the chemicals were purchased from commercial sources and used without further purification. Native cellulose nanofiber (2.8 wt %) was purchased from Bio-Plus, Kaolinite clay was purchased from Alpha minerals and chemicals. 1H,1H,2H,2H-perfluorooctyltriethoxysilane (FS, 98%) was purchased from Aldrich, 3-(2-aminoethylamino) propyltrimethoxysilane (AS, commercial grade) was purchased from Rishichem distributors. n-Octadecylsilane was purchased from Gelest. Ethanol, heptane, hexane, benzene, toluene, dimethylformamide (DMF), tetrahydrofuran (THF), chloroform, dichloromethane and acetone were procured from RANKEM, India. All the chemicals were used without further purification. Sand paper (P320) was purchased from a local hardware shop.

Chemical Modification of Native Hydrophilic Material

The waterborne superhydrophobic material was synthesized by an easy chemical modification of hydrophilic materials such as CNFs and kaolinite clay at room temperature with two functional silanes.

Chemical modification of CNFs was made through a wet chemical process in an aqueous medium where well-dispersed native hydrophilic CNF was mixed with two different functional silanes, 1H,1H,2H,2H-perfluorooctyltriethoxysilane (FS) and 3-(2-aminoethylamino) propyltrimethoxysilane (AS) under vigorous stirring conditions and kept for 6 to 7 h at room temperature. Before mixing with other chemicals, hydrophilic CNFs were well dispersed by sonication for 30 min in water. These chemically modified CNFs, obtained in a wet chemical process were diluted in water and spray coated on a glass slide (for characterization) and laboratory made hydrophilic CNF paper. Though spray coating was used to prepare all the samples, other techniques such as dip coating, doctor blading, etc., are equally efficient for sample preparation. Coated samples were dried at room temperature (30° C.) and tested through various experiments.

For kaolinite clay, water dispersed clay sheets (6 wt %) were mixed with two different functional silanes, 1H,1H, 2H,2H-perfluorooctyltriethoxysilane (FS, 2 wt %) and 3-(2-aminoethylamino) propyltrimethoxysilane (AS, 1 wt %) and kept under vigorous stirring conditions for 6 to 7 h. Whereas silanization reaction, in general, is very fast in aqueous medium and because of the low solubility of FS in water, at first it gets adsorbed on the clay surface and hydrolyzes slowly in water and gets attached covalently to the clay surface [H. Teisala et al., Advanced Materials Interfaces, 2014, 1,1300026]. Thus, a water dispersed functionalized clay composite was obtained and spray coated on different substrates followed by drying at room temperature. Quantitatively, 1 mL of the as-prepared composite solution was mixed with water in 1:1 ratio and sprayed over a glass slide and a paper, having an area of 75×26 mm2 Upon drying at room temperature (30° C.), a superhydrophobic film of nearly 12 micron thickness (on a glass surface) was obtained which shows a high CA >170° (±2°) and low CAH <5° (±2°) for water. However, to facilitate faster evaporation, the coated substrates were dried in warmer condition (45° C.) occasionally, without affecting the properties of the material. Later on, this water-based material was stored at room temperature in the laboratory environment for more than a year without any special precaution. Wherein n-octadecylsilane shows similar result as of 1H,1H,2H,2H-perfluorooctyltriethoxysilane (FS) when used for kaolinite clay.

The water-soluble amino silane is used to design a transparent or semi-transparent, robust waterproof or water repelling coating via spontaneous chemical reaction at room temperature with unsaturated molecules like acrylates (monomer/polymer, polar/nonpolar) and others (monomer/polymer, polar/nonpolar) depending on their solubility on different solvents (polar/nonpolar).

Preparation of Superhydrophobic/Waterproof Paper:

The waterproof paper was prepared by spraying waterborne chemically functionalized CNF dispersion on laboratory-made hydrophilic CNF paper. Such CNF paper was prepared through the evaporation method where homogeneous CNF solution was poured carefully in a plastic petridish maintaining the homogeneity of the solution everywhere in the solution bed. Once the solution was dried properly at room temperature, the film was taken out by applying mild heat (30-35° C.) and was used to prepare superhydrophobic/water repellent paper with modified CNF coating. In short, as synthesised aqueous dispersion of modified CNF composite was diluted with water at 1:2 volume ratio and sprayed on laboratory made hydrophilic CNF papers. Later it was dried at room temperature (30° C.) and tested with different experiments.

Durability Test for the Waterproof Paper:

Durability of the flexible waterproof paper was tested with induced mechanical abrasions and various environmental stresses. For mechanical abrasion, sand paper abrasion (with a load of 50 g) and finger wiping tests, samples were evaluated through static CA and CAH measurements. Environmental stresses like direct sunlight exposure and effect of bending/twisting of waterproof paper were also studied with CA and CAH measurements. For effect of direct sunlight exposure, the coated paper was kept under sunlight and evaluated with CA and CAH measurement after each 5 h of exposure. This was further continued 10 times. For bending/twisting tests, the coated paper was twisted in different possible ways (90°, 180°, rolling, etc.) and CA and CAH were checked after every 10 cycles of twisting.

Abrasion Resistance of Modified CNF Coated Substrate:

Multiple abrasion tests such as sand paper abrasion with a load of 50 g, scratching with a knife, finger wiping and tape adhesion tests were performed to evaluate the abrasion resistance and adhesion strength of the coating on different substrates (glass and laboratory made paper). For sand paper abrasion, a piece of sand paper (P320) was kept between the coated glass surface with a load of 50 g, and the set up was moved for 5 cm along the coating. After completion of 10 cycles, the wettability of the abraded surface was tested with both jet motion and CA of water droplets. This experiment was further repeated with multiple cycles. A similar methodology was adopted for the finger wiping test, where the surface was rubbed back and forth multiple times with thump and subjected to water flow and CA measurements. For knife scratching and tape adhesion tests, a surface were evaluated with similar water jet motion and CA measurements after each experiment and was repeated 10 times.

Durability of the Coated Surface (Modified CNF) Upon Cyclic Thermo-Chemical Perturbations:

Durability of the coating was evaluated by measuring the static contact angle of water droplet on the tested surface. Various external stresses such as (Set-1) exposure to various organic fluids, (Set-2) high temperature treatment, (Set-3) low temperature treatment and (Set-4) exposure to direct sunlight (longevity test) were used to test the surfaces. Stability of the water repelling coating upon chemical stresses has been tested by keeping the coated surface inside various organic fluids for 1 h. Different polar and nonpolar solvents like ethanol, tetrahydrofuran (THF), dimethylformamide (DMF), toluene and hexane were used to simulate chemical damages. After each solvent treatment, the surface was dried at room temperature and CA of water droplet was measured. Each solvent was tested 2 times. Thermal effects on the surface in extreme conditions were performed by keeping the surfaces at 200° C. and −80° C. for 2 h (Set-3). Effect of direct sunlight on the coated surfaces was tested upon exposing it outside for 2 months (Set-4). While the same coated glass surface was used 10 times in cyclic fashion for each set (for Set-1, Set-2 and Set-3), due to time constraints, 10 different surfaces were used to perform the Set 4 experiment.

Abrasion Resistance of Modified Clay Coated Substrate:

The durability of the coating was tested by measuring the static contact angle (CA) of water droplets after imparting cyclic mechanical stresses on the surfaces. Hard mechanical stresses include scratching with knife and sand paper abrasion test. For scratching with a knife, 10 different scratches were made on the same surface and subjected to CA measurements after every scratch. Sand paper abrasion test was performed by keeping a sand paper between the coated surface with a load of 50 g and the sand paper was moved 10 complete cycles over the surface. CA of water droplets was measured after every 10 cycles and continued similarly for 10 times. Soft mechanical stresses were induced in the form of tissue paper abrasion and finger wiping abrasion. Same methodology (mentioned above) was used in this case also. For each test (both hard and soft mechanical stresses) same surface was used repeatedly.

Durability of the Coated Surface (Modified Clay) Upon External Perturbations:

Durability of the clay coated substrates (here coated paper) against various mechanical abrasions (sand paper abrasion and finger wiping test) and environmental stresses (effect of sunlight and effect of bending) was evaluated through static CA and CAH measurements in a cyclic fashion. Chemical durability of the coated surface was tested with different polar and nonpolar solvents like ethanol, tetrahydrofuran (THF), dimethyl sulfoxide (DMSO) and heptane. Surfaces were kept inside various organic solvents the static contact angle of water droplet was measured after taking the surface out from the solvent in a regular time interval for 170 h.

Antibacterial and Antifungal Test:

Interaction of bacteria with the superhydrophobic material was tested on equally sized paper samples using gram-negative Escherichia coli (ATCC 10536). E. coli was inoculated in 10 mL of Luria Broth (LB) (Himedia) overnight in an air bath shaker at 37° C. and 300 rpm to reach the exponential growth phase. The bacterial solution was centrifuged at 3000 rpm for 5 min to remove the used media and washed twice with sterile saline. The suspension was diluted 1,000× in sterile saline. Using the spread plate method, plating concentrations were determined as 105 colony forming units (CFU)/mL For testing the bacterial resistance property, the coated and uncoated papers were surface sterilized and dipped in the bacterial solution for 2 min. Substrates were tilted at 90° to allow the bacterial solution to roll off, if possible. Subsequently, samples were rinsed with 50 μL of sterile saline. The surfaces of the substrates were then stamped face-down in Mac Conkey agar plates (Himedia) to transfer residual bacteria. The agar plates were incubated for 24 h at 37° C. in a humidified incubator. Images were taken after 24 h and bacterial growth in coated and uncoated paper samples was compared. Agar was prepared prior to experiments according to the manufacture's protocol. For interaction of fungi with the superhydrophobic paper, isolated airborne *Aspergillus* sp. was placed beside the equally sized test paper samples. This paper was placed on a square block of potato dextrose agar in a petridish. A sterile moist cotton was also placed inside the petridish to maintain the humidity. This set-up was incubated for 4 days at 25° C. until visible spores appeared.

The synthesis of waterborne superhydrophobic material by chemical modification at room temperature with two functional silanes is described in the following description.

Figure 1:
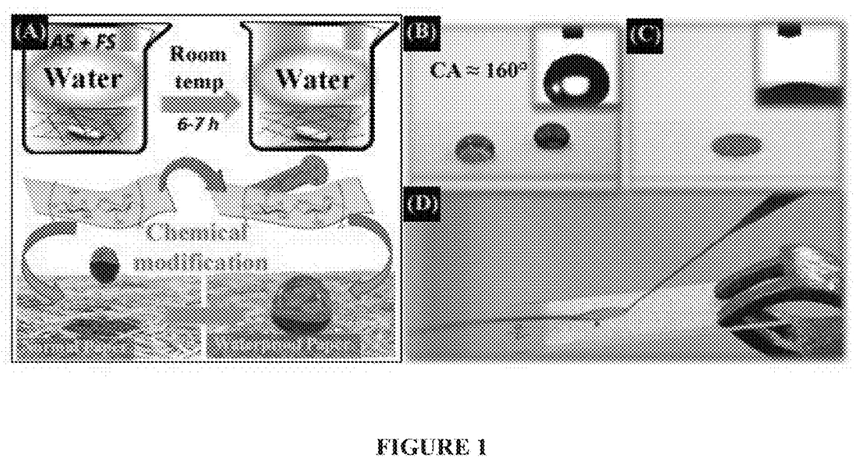
FIG. 1 shows schematic representation of cellulose nanofibers (CNFs) based waterborne superhydrophobic material, the building block of waterproof paper (A). (B&C) show water droplet on modified and native CNFs coated surface. Insert shows the static contact angle of the water droplet, (D). Continuous jet flow on coated glass. KMnO4 and NiSO4 aqueous solutions were used in B, C and D, respectively, instead of pure water to have color contrast.

FIG. 1A illustrates the synthesis of chemically modified/fluorinated CNFs in water that forms excellent water repelling thin films upon coating over various substrates. Briefly, native hydrophilic CNFs were chemically functionalized with two different functional silanes, 1H,1H,2H,2H-perfluorooctyltriethoxysilane (FS) and 3-(2-aminoethylamino) propyltrimethoxysilane (AS) by a wet chemical process in water at room temperature and spray coated both on hard (glass) and soft (paper) substrates. However, these active functional groups also facilitate the covalent attachment between CNFs and silane molecules, FS and AS. Thus, a complete reversal of the chemical features of cellulose not only increases the wetting resistance of the coating, but also forces water to sit as a droplet (FIG. 1B). This minimises the air-water-solid interaction energy on the superhydrophobic surface, unlike unmodified. CNFs-coated surface where water spreads easily (FIG. 1C). The extent of water repelling property of the coated surface was also demonstrated by rolling off or jet motion of water drops on the modified CNFs-coated substrate (FIG. 1D). This was further studied with a droplet drag experiment where water droplet (~2 µL) attached with a needle was dragged back and forth over the coated surface by 5 cm. Deformed shape of the water droplet during the experiment can be related to contact angle hysteresis (CAH) which is the result of fibrous structure induced macroscale roughness of the prepared film. This was also observed during the roll off angle measurement. Water droplet having a volume greater or equal to 10 µL rolls off easily with a roll-off angle less than 10° (±2°). However, for smaller volume droplets, while it did not roll off, it did not stick to the surface either. It immediately flew off with a gentle blow of air. Excellent water repellent property of the material was also evaluated with vertical drop adhesion test for multiple cycles where water droplet (~2 µL) was seen to detach from the superhydrophobic surface without leaving any trace. In addition the amino silane functionalized superhydrophobic coating composition is capable of adsorbing moisture and $CO_2$ from air at room temperature.

Figure 2:
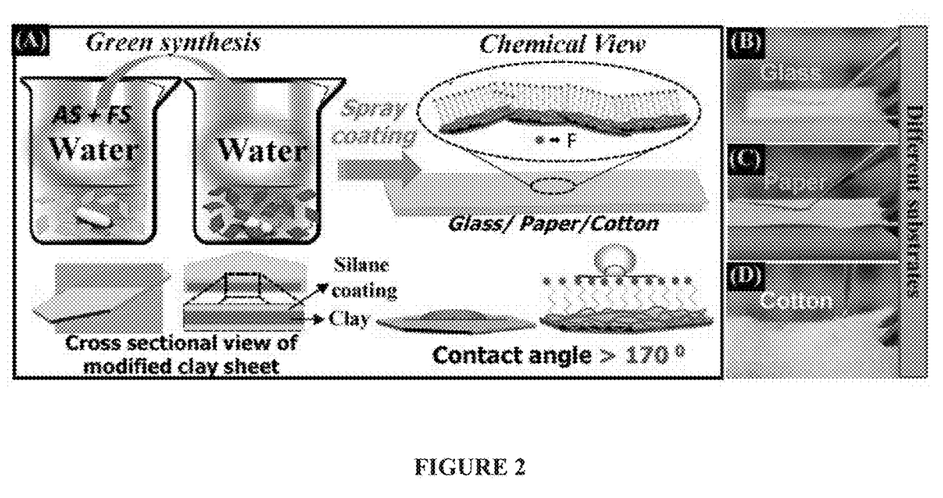
FIG. 2 shows (A) schematic representation of the waterborne super hydrophobic clay material (synthesis of the dispersion and the prepared thin film). Continuous jet flow on coated (B) glass, (C) filter paper and (D) bouncing of water on modified cotton surface. KMnO4, $CoCl_2$ and $CuSO_4$ aqueous solutions were used in B, C and D, respectively, instead of pure water to add color contrast.

FIG. 2A illustrates the methodology used for the preparation of the superhydrophobic film over various substrates. Applicability of the waterborne clay was tested both with hard and soft substrates such as glass, cotton, fabrics, etc., having different morphologies. It was seen that water droplets are spherical on superhydrophobic surfaces and they show bouncing or jet motion of water droplets. Similar jet motion of water both on coated glass slide and modified paper (FIG. 2B, C). Moreover, bouncing off of water droplets even on modified cotton surface (FIG. 2D) shows the universal applicability of the material. Being dispersed in water, functionalized clay sheets readily sit on hydrophilic fibers and get coated efficiently all over the surface of cylindrical fibers by strong capillary action and large surface tension force. The extent of water repelling property of the material on fibrous soft surfaces was revealed from the unstable, frictionless movement of water drops on modified paper. This can be compared with the lotus leaf effect; a well-known example of the natural superhydrophobic surface.

Figure 3:
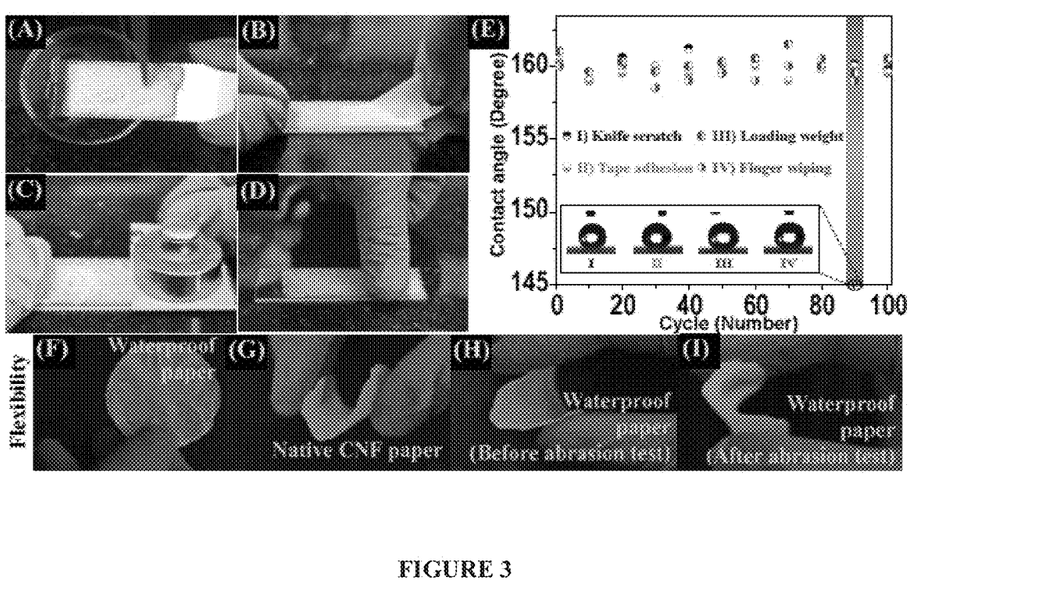
FIG. 3 shows mechanical damages induced on modified CNFs coated glass surface. (A) Scratching with a knife, (B) tape adhesion test, (C) sand paper abrasion with 50 g of load and (D) finger wiping, (E) Durability/longevity test for the water repelling surface. Change in CA of water droplet during multiple abrasion cycles. One experiment consists of 10 complete abrasion cycles. (Inset) Photograph showing static contact angle of water on mechanically tested surfaces (after the 9th experiment, i.e., 90th cycle). (F-I) Physical appearance and flexibility of waterproof paper before and after abrasion tests.

Modified CNFs coated superhydrophobic surfaces (glass) showed excellent durability when it was subjected to various mechanical damages. Different sets of experiments also reflect the extent of adhesion of the material on different surfaces without any adhesive (e.g., glass and paper). Initially, the coated surfaces were subjected to knife scratch and peel-off test (FIG. 3A, B). Durability of the coating was further tested against sand paper abrasion with a load of 50 g and finger wiping experiment (FIG. 3C, D) wherein the surfaces were abraded for a length of 5 cm back and forth. For all the tests, contact angle (CA) of water droplets were measured after each 10 consecutive cycles and plotted in FIG. 3E. Negligible variation in static CA over the mechanically perturbed surfaces implies the robustness and stability of the coating. Similar mechanical robustness with retention of super hydrophobicity was also observed for the waterproof paper upon the above-mentioned abrasion tests. Notably, mechanical flexibility of the abraded paper remained unchanged (FIG. 3F-I) while the mechanical strength for the waterproof paper was enhanced compared to both native CNF paper (uncoated) and coated CNF paper. The incorporated chemical functionality (secondary amine) on the CNFs which gets self-polymerised at room temperature increases the adhesion between the fibres as well as with the substrate leading to durability of the coating.

Figure 4:
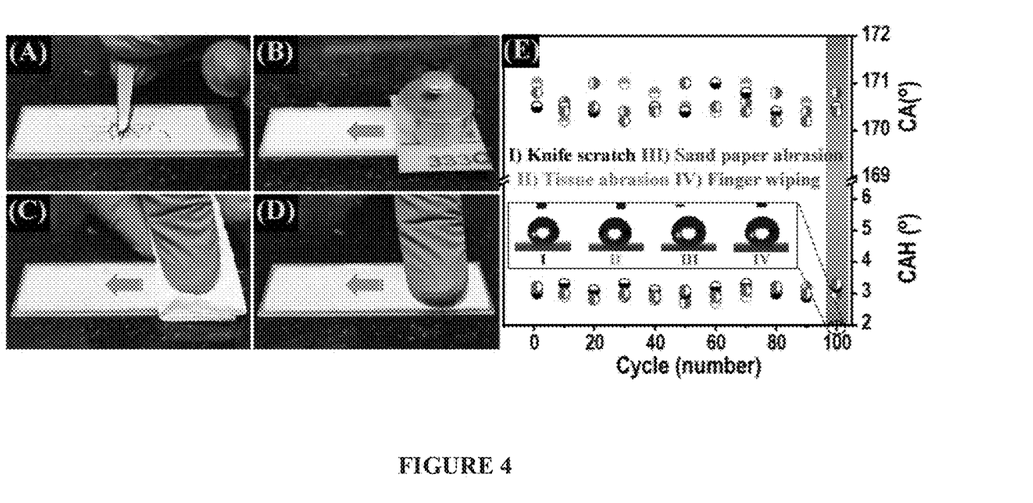
FIG. 4 shows induced hard and soft mechanical damages on modified clay spray-coated glass substrates. Hard mechanical damages: (A) scratching with a knife and (B) sand paper abrasion with 50 g of the load. Soft mechanical damages: (C) abrasion with tissue paper and (D) finger wiping. E) Durability/longevity test with above-mentioned mechanical tests. Change of CA and CAH of water droplet during the multiple abrasion cycles. One experiment consists of 10 abrasion cycles. (Inset) Photograph showing static contact angle of water on the tested surfaces (after the 9th experiment).

In case of clay based superhydrophobic material, diamino functional groups interlink the clay sheets and help to anchor them efficiently over substrates during the evaporation process through spontaneous in-situ polymerization. Anchoring induced stability was studied with various artificially induced mechanical stresses. For instance, the coated surface was subjected to hard mechanical stresses such as sandpaper abrasion test with a load of 50 g and knife scratch tests (FIG. 4A, B). Durability of the coating was also evaluated by soft mechanical stresses like tissue paper abrasion and finger wiping test (FIG. 4C, D). In this case, abraded surfaces were observed to maintain their superhydrophobic property with easy movement of water streams over them. For all the cases, retention of the water repelling nature of the abraded surfaces was evaluated thoroughly with CA and CAH measurements after each experiment (FIG. 4E) where each experiment consisted of 10 complete abrasion cycles of corresponding tests. Consistent values of CA and CAH at an average of 171° (±2°) and 3° (±2°), respectively, after each experiment show the durability of the material against external forces. These mechanically perturbed surfaces were further studied with wettability sensitive vertical drop test (water droplet from the needle was moved vertically and touched the surface and went back) and droplet drag test (water droplet from the needle was dragged over the surface back and forth for 5 cm)

Figure 5:
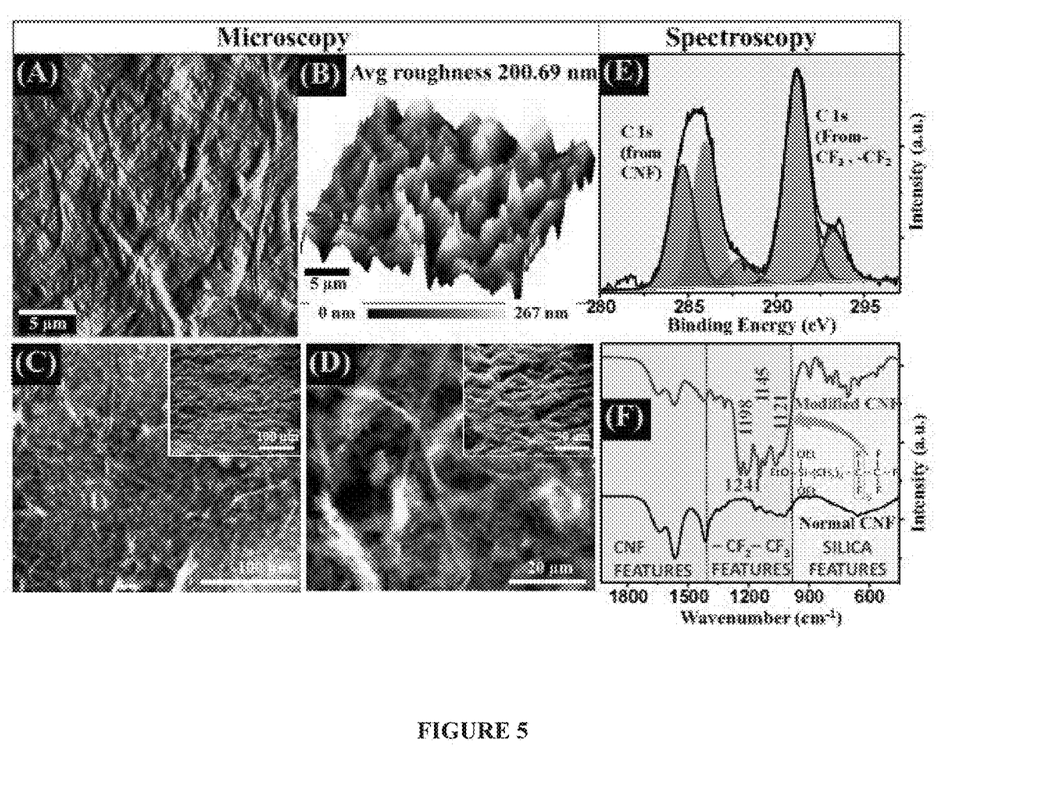
FIG. 5 shows characterization of the modified CNF coated thin film. AFM image of the coated glass substrate, 2D view (A) and 3D view (B). (C,D) SEM images in different magnifications showing the inherent roughened fibrous nature of the film. Inset tilted (45°) view showing the roughness of the surface. (E) De-convoluted SPS spectrum in the C1s region showing the presence of carbons having different electronic environment. (F) FT-IR spectra of the dried material (normal and modified CNF). Peaks at 1121, 1145, 1198 and 1241 cm-1 (shaded area) indicate the presence of C-F functionalities in the modified clay.

Surface characteristics of chemically functionalized CNFs coated glass substrates were studied with AFM and SEM. Increased surface roughness of the order of 200 nm was observed for the modified CNF coated film (FIG. 5A, B) compared to native CNF coated film. This may be the result of the hydrophobic effect, namely an interaction between water and low surface energy molecules (here, fluorinated CNFs), leading to the more organized surface structure of fluorinated CNFs by minimising the interaction energy during drying. Similar rough surface morphology was also observed in SEM (FIG. 5C,D). These were compared with the modified CNF film. Chemical composition as well as the nature of the chemical bonding of the foreign molecules, which are considered to be the underlying reasons for both stability and robustness of the material, was characterized in detail with XPS and IR spectroscopy (FIG. 5E, F). Presence of two chemically different carbons i.e., i) cellulosic carbons (C—C/C—O/O—C—O) and ii) carbon attached with fluorine (C—F bond in FS) in the deconvoluted C1s spectrum of the modified CNF sample confirmed the covalent linkage of molecules with CNFs. However, the peak for C—O and O—C—O shifted slightly to a lower binding energy value (0.6 eV), suggesting the formation of a bond between Si (from AS or FS) and OH (from CNF). Carbons attached with fluorine appear in the higher binding energy region of the XPS spectrum (291-293 eV), as fluorine polarises the C—F bond (FIG. 5E). Peaks at 686.9 and 684.5 eV of the XPS survey spectrum correspond to the deconvoluted. F1s peak of C—F bonds (—CF2 and —CF3, respectively). The difference in IR spectral features (FIG. 5F) between modified and native CNFs also implies the change in its chemical signature. Observed characteristic peaks at 1121, 1145 1198 and 1241 cm−1 in the modified CNF correspond to the various stretching modes of —CF2 and —CF3. New features at 1165 and 1130-1000 cm−1 correspond to different Si—O—C and Si—O—Si vibration modes, respectively. Therefore, microscopic and spectroscopic studies suggest that the unusual water repelling property of CNFs should arise from both enhanced roughness and low surface energy.

Figure 6:
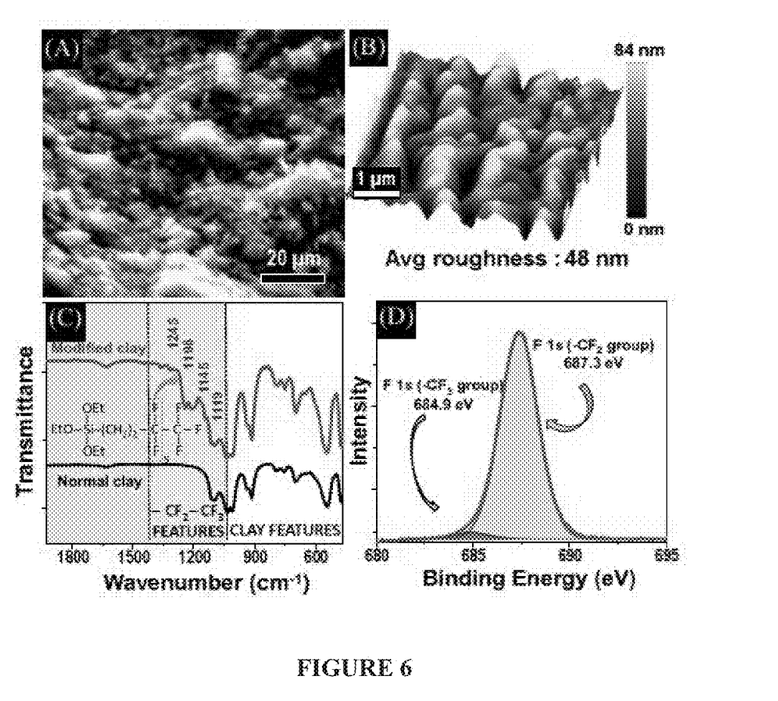
FIG. 6 shows characterization of the modified clay coated thin film. (A, B) SEM and AFM image respectively, of spray coated glass substrate which shows the extent of roughness present on the surface. For SEM, the surface was tilted at a 45° angle. (C) FT-IR of the dried material. Peaks at 1119, 1145, 1198 and 1245 cm-1 (shaded area) indicate the presence of —C—F functionalities in the modified clay. (D) XPS shows the presence of fluorine in the sample which is coming from FS.

The surface roughness of the modified clay coated thin film (on glass) measured by scanning electron microscopy (SEM) (tilt angle 45°) was found to be 0.5 µm (FIG. 6A). Similar uniform and periodic structures were found throughout the surface which was formed during spontaneous drying of the material at room temperature. While SEM showed micron scale surface structures, atomic force microscopy (AFM) revealed enhanced surface roughness (FIG. 6B) as compared to a normal clay coated thin film. For instance, in case of modified clay coated thin film, average surface roughness was found to be 48 nm whereas it was 24 nm for normal clay coated thin film. Such dual structured surfaces can be compared with nanopillar or nanograss surfaces as well. Along with the surface morphology, chemical features of the surface also play an important role to obtain such extreme water repellent characteristics of the thin films. Infrared spectroscopy (IR) and X-ray photoelectron spectroscopy (XPS) reflect the chemical composition of the coated thin film. FIG. 6C shows the IR spectra of unmodified clay and functionalized clay materials. Vibrational features are observed at 1119, 1145, 1198 and 1245 cm−1, respectively, assigned to the stretching and bending modes of C—F bonds in FS (—CF2 and –CF3 functionalities). Intense peaks at 687.3 and 684.9 eV in the XPS spectrum correspond to the F1s of —CF2 and —CF3 groups, respectively of FS (FIG. 6D). Both microscopic and spectroscopic measurements suggested the reasons of super hydrophobicity which are related to the surface roughness as well as the presence of low surface energy molecules.

Figure 7:
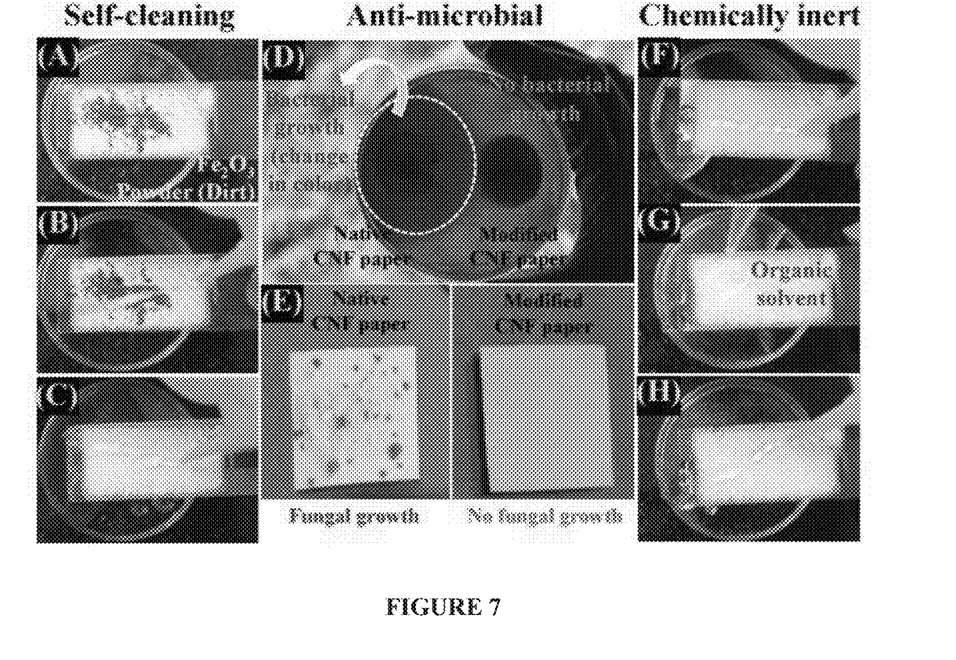
FIG. 7 shows (A-C) Self-cleaning property of the superhydrophobic material coated glass surface. Iron oxide (Fe2O3) powder was used as the model dirt. (D, E) Microbe-resistive nature of modified CNF coated paper. Anti-bacteria (D) and anti-fungal (E) properties with native CNF paper as a reference sample. (F-H) Water-repelling behavior after artificially induced chemical damages with various organic solvents. Organic solvents having different polarities such as hexane and ethanol were used to demonstrate the effect. Ethanol treated surface was used in photographs.

Self-cleaning property of the superhydrophobic surfaces has attracted people in various ways. This was demonstrated with iron oxide particles in the form of inorganic dust which eventually got washed away with rolling water droplets (FIG. 7A-C). The coated paper when exposed to bacterial/fungal species showed no growth over its surface in spite of providing favourable conditions for growth. Even after prolonged incubation, the paper remained resistant to microbes. Observed color change around the unmodified CNF paper (FIG. 7D) implies the growth of bacteria. For fungal contamination also, visible color change was seen unlike the coated paper (FIG. 7E). This microbial resistance is attributed to the water repelling nature of the coated surface. The coating prevented the access of the organisms to the nutrients and moisture needed for growth. Moreover, it has been seen that reduced protein adsorption plays an important role in reducing bacterial adhesion on surfaces. Chemical inertness or the stability of the modified CNF coated surfaces were studied upon exposing the surface to organic solvents of different polarity such as hexane and ethanol (FIG. 7F-H).

Figure 8:
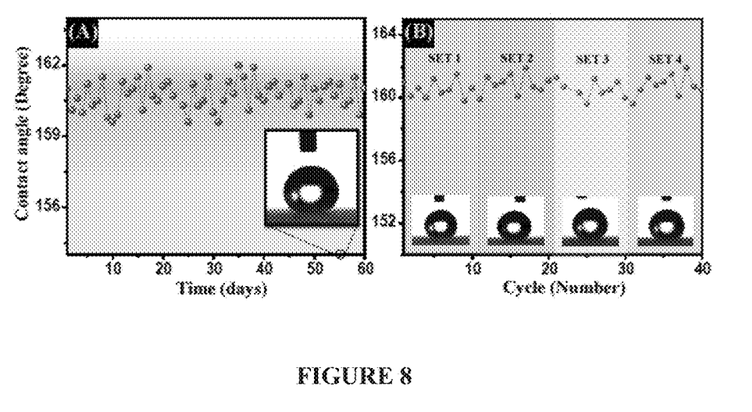
FIG. 8 shows durability of the coatings in (A) ambient condition (without any external perturbation) and (B) externally applied cyclic perturbations: (Set-1) exposure to various organic fluids, (Set-2) high temperature (200° C.) treatment (Set-3) low temperature (−80° C.) treatment and (Set-4) exposure to direct sunlight (longevity test). For both the cases (A&B), static CA of water droplet was measured at a regular time interval. (Inset) Photograph showing static CA of water droplet after (A) 55 days and (B) each set of experiments.

Though cellulose based newly synthesised superhydrophobic material has shown significant resistance towards conventional mechanical and chemical stresses, the longevity of the material under various hazardous conditions is an important parameter for real-time applications in different technologies. This was tested in two different ways. In the first case, the same sample was kept in laboratory atmosphere and examined (by static CA measurements) for a long time (2 months) without applying any external stresses (FIG. 8A). Secondly, the effect of different external perturbations such as exposure to various organic fluids (a diverse range of polarity), temperature and direct sunlight was investigated in a cyclic fashion (FIG. 8B). Details of the cycles are explained in detail in the experimental section (for each set of experiments, the same surface was used). For both the cases, the wettability of the surfaces was studied by measuring the static CA of the water droplet. The consistent value of CA, on an average 160°, for both the experiments demonstrates the durability of the material for day to day applications.

Figure 9:
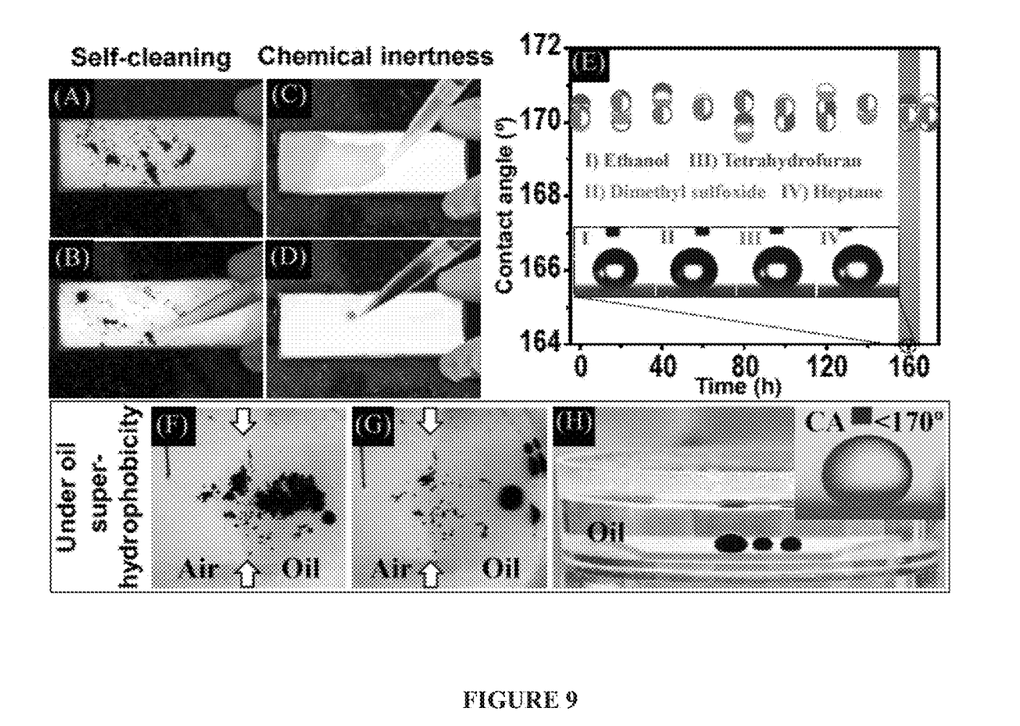

Having low surface energy, the clay based superhydrophobic material coated glass surface showed self-cleaning property where graphite powder was used as dirt which eventually got washed away with the rolling water droplets (FIG. 9A, B). Chemical robustness of this superhydrophobic surface was tested with various solvents with a wide range of polarities (ethanol, dimethyl sulfoxide, dimethylformamide, tetrahydrofuran, toluene, hexane, heptane and n-octane). Surprisingly, this coated surface retains its initial properties and remains unaffected after cyclic washing with multiple organic solvents, demonstrated in FIG. 9C, D. Durability of the coating under such chemical stresses was further tested by keeping the surfaces within the solvents for a long time (170 h for each solvent). For each solvent system, the same surface was used repeatedly for the entire experiment. After long incubation time, surfaces retained their property and kept functioning efficiently. These were seen in the CA values at regular time intervals of 20 h for a duration of 7 days (FIG. 9E). To identify the change in wettability of the superhydrophobic coating in detail, the treated (7 days solvent treated) surfaces were also studied by CAH measurements, droplet drag and vertical drop experiments which are very sensitive towards surface wettability.

Surface energy (of surfaces) and surface tension (of liquid, here water) governed this superhydrophobic phenomenon frequently gets affected in presence of oils. Mostly oils, having low surface tension, easily get into the surface micro-structures and remove the air completely which makes the surface superhydrophobic. Again, water droplets possess lower interfacial tension inside oils compared to the air-water interface. Both of these enhance the possibility of pinning of water droplets on the surface. Interestingly, this superhydrophobic surface was observed to function also at the oil-solid interface with equal efficiency. For laboratory experiments, non-polar long chain hydrocarbons (such as n-octane) were used as models for oil. Self-cleaning property of the surface was also demonstrated with rolling water droplets when a portion of the surface was kept inside oil (FIG. 9F, G). Water droplets easily roll off through both the phases (air and oil) despite sudden change in the interfacial tension and kept itself clean from dirt (potassium permanganate was used as a dirt). Under oil super hydrophobicity of the modified clay coated surface was further studied by keeping the colored water droplets on the superhydrophobic surface kept inside oil is pictorially presented in FIG. 9H. Inset shows the measured static contact angle of the water drop inside n-octane which was observed to be greater than 170° (±2°). Even after 1 h of incubation, these droplets (FIG. 9H) restored their spherical shape and started rolling upon mild shaking with hand.

Figure 10:
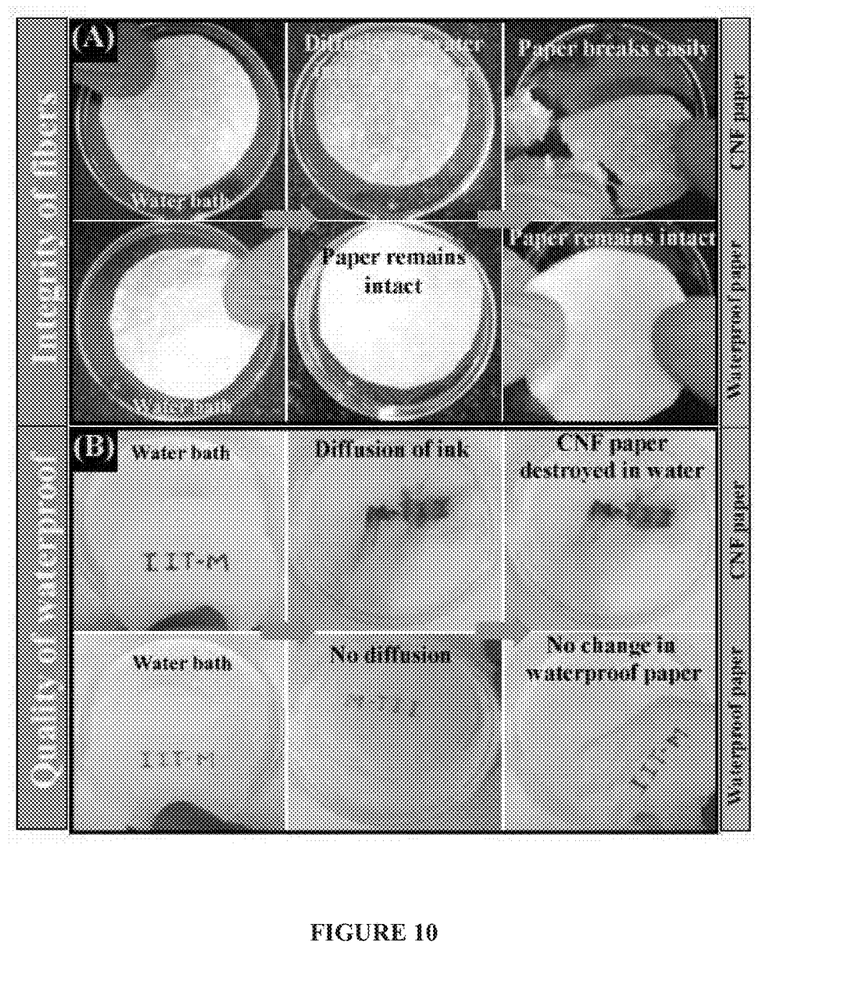
FIG. 10 shows key features of the prepared waterproof paper for paper-based technologies: (A) Integrity of the fibres upon exposing to water for a longer time (the waterproof paper was compared with normal cellulose paper). (B) The extent of waterproof nature. Ink on the normal paper diffused as it came in contact with water whereas it remained intact on waterproof paper. Change in contrast of ink color is because of the uncontrollable soaking of ink in hydrophilic cellulose paper.

Being hydrophilic in nature, normal papers easily get wet through the diffusion (capillary action) of water and affect the integrity of the papers. In this context, waterproof paper with excellent resistance towards bacterial and fungal growth is advantageous for books, currency notes, medical diagnostic devices and paper-based electronics. Proof of concept experiments have been performed as shown in FIG. 10. Higher integrity factor for the modified CNF paper in comparison to normal CNF paper was observed when both the papers were put in water bath for the same time. Within a few minutes, normal CNF paper got wet and sank in the water (see the change in contrast). After 15 minutes of water treatment, while normal CNF got destroyed by a small force, modified CNF paper showed excellent resistance and remained intact (FIG. 10A). Furthermore, to show the quality of waterproof nature, native CNF and modified CNF coated paper (single side coated) were tested with ink diffusion where both the papers were written with blue ink (water-diffusible) and exposed to a water bath at the same time (ink written side was facing water). In this case also within a few seconds, ink from the native CNF paper started diffusing in water whereas, letters on the modified paper remained intact (FIG. 10B). We believe that these important properties of multifunctional waterproof paper will enhance the usability of such paper in paper-based technologies including flexible electronics as well as microfluidic devices.

Figure 11:
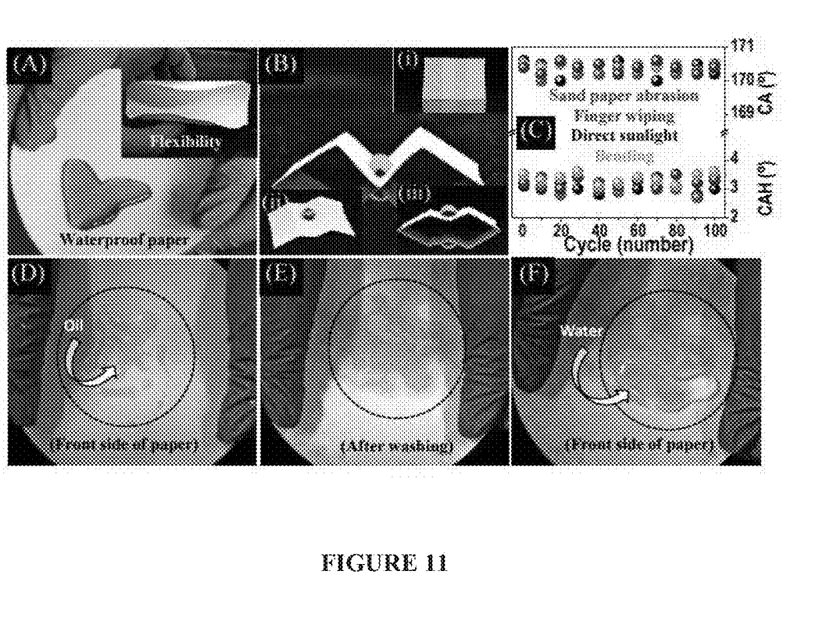

Being dispersed in water, these chemically modified clay sheets sit on fibrous materials efficiently through surface tension force or strong capillary action and coat it very efficiently without affecting the mechanical flexibility of the substrate. This was demonstrated with coated filter paper (Whatman 44) in FIG. 11A. FIG. 11B pictorially represents the effect of bending/twisting on the water-repelling nature of the coated paper. For this, a colored water droplet was placed on a strained folded paper that forced droplet to change its shape to oval. However, water repelling nature of the paper remains intact and no stain of the colored drop was observed even after 10 mins (FIG. 11B i; folded paper was kept vertically). Droplet on the relatively relaxed folded paper was pictorially shown in FIG. 11B (ii & iii; side and top view). Durability of this waterproof paper against various mechanical abrasions (sand paper abrasion and finger wiping test) and environmental stresses (effect of sunlight and effect of bending) was evaluated through static CA and CAH measurements in a cyclic fashion and the data are plotted in FIG. 1C (details of the experiments were discussed in experimental section). Retained super hydrophobicity of the coated paper under these/such conditions, a much desired property for various paper-based technologies, shows its applicability in day to day use. The oil patches were subjected to multiple cleaning cycles with different organic solvents (ethanol and acetone). Though removing oil from the paper is rigorous and difficult as it enters within the pores of the paper and gets immobilised on the fibers, interestingly, the washed filter paper showed almost equal water repelling nature (FIG. 11D-F) and keep functioning.

For n-octadecylsilane functionalized clay, similar properties were observed as mentioned and explained with fluorosilane modified clay.

It may be appreciated by those skilled in the art that the drawings, examples and detailed description herein are to be regarded in an illustrative rather than a restrictive manner.

We claim:

1. A superhydrophobic coating composition, said composition comprising hydrophilic material selected from cellulose nanofibers and clays in the range of 0.25 wt %-2.06 wt % and one or more silanes in the range of 0.24 wt %-2.05 wt %, and the remaining being water in the range of 97.7 wt %-99.51 wt %, wherein said hydrophilic material is chemically modified and functionalized using said silanes in aqueous medium and free of any organic solvent.

2. The coating composition as claimed in claim 1, wherein clays include kaolinite clays.

3. The coating composition as claimed in claim 1, wherein the silanes include amino silane, fluorosilane and alkyl silane.

4. The coating composition as claimed in claim 3, wherein the amino silane includes 3-(2-aminoethylamino) propyltrimethoxysilane, the fluorosilane includes 1H, 1H, 2H, 2H-perfluorooctyltriethoxysilane and the alkyl silane includes n-octadecylsilane.

5. The coating composition as claimed in claim 3, wherein the amino silane is used to develop transparent water repellent coating with fluorosilanes, unsaturated molecules including monomeric, polymeric, polar and nonpolar acrylates depending on their solubility and dispersibility in different solvents.

6. A superhydrophobic cellulose nanofiber coating material, comprising a composition including, 0.25 wt % of hydrophilic cellulose nanofiber (CNF), 0.61 wt % of 1H,1H, 2H,2H-perfluorooctyltriethoxysilane, 0.92 wt % of 3-(2-aminoethylamino) propyltrimethoxysilane and the remaining 98.22 wt % being water, wherein said cellulose nanofiber is chemically modified and functionalized using said silanes in aqueous medium,
    wherein when applied to a substrate, the superhydrophobic cellulose nanofiber coating material provides a water contact angle greater than 160°.

7. A superhydrophobic kaolinite clay coating material, comprising a composition including, 1.47 wt % of hydrophilic kaolinite clay, 0.24 wt % of 1H, 1H, 2H, 2H-perfluorooctyltriethoxysilane/0.36 wt % n-octadecylsilane, 0.49 wt % of 3-(2-aminoethylamino) propyltrimethoxysilane and the remaining 97.68 wt %-97.8 wt % being water, wherein said kaolinite clay is chemically modified and functionalized using said silanes in aqueous medium,
    wherein when applied to a substrate, the superhydrophobic coating composition provides a water contact angle greater than 170°.

8. A substrate coated with the composition as claimed in claim 1, said substrate resists mechanical abrasion.

9. A substrate coated with the composition as claimed in claim 1, said substrate exhibits thermal stability in the range of −50° C. to 200° C. based on contact angle measurement of ethanol, tetrahydrofuran (THF), dimethylformamide (DMF), toluene and hexane.

10. A substrate coated with the composition as claimed in claim 1, said substrate exhibits antibacterial and antifungal properties.

11. The coating composition as claimed in claim 1, wherein when applied to a substrate, the superhydrophobic coating composition adsorbs moisture and $CO_2$ from air at room temperature.

* * * * *